United States Patent
Akashi et al.

(10) Patent No.: US 7,948,670 B2
(45) Date of Patent: May 24, 2011

(54) OPTICAL ATTENUATOR

(75) Inventors: Tamotsu Akashi, Kawasaki (JP);
Tsuyoshi Yamamoto, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 132 days.

(21) Appl. No.: 12/382,908

(22) Filed: Mar. 26, 2009

(65) Prior Publication Data
US 2009/0323167 A1  Dec. 31, 2009

(30) Foreign Application Priority Data

Jun. 30, 2008 (JP) ................. 2008-171765

(51) Int. Cl.
*G02B 26/00* (2006.01)
*G02B 6/00* (2006.01)

(52) U.S. Cl. ........ 359/290; 359/558; 359/566; 385/140; 385/27; 385/31; 385/34; 385/37

(58) Field of Classification Search .......... 359/290–295, 359/298, 242, 259, 368, 385, 556, 566, 857; 385/24, 27, 31, 34, 37, 16–18, 140; 250/227.12, 250/330, 400, 458.1, 548; 356/400; 372/34
See application file for complete search history.

(56) References Cited

U.S. PATENT DOCUMENTS

| | | | | |
|---|---|---|---|---|
| 4,503,541 A * | 3/1985 | Weller et al. | ................ | 372/50.1 |
| 6,674,953 B2 * | 1/2004 | Shi et al. | ................ | 385/140 |
| 7,352,928 B2 * | 4/2008 | Chen et al. | ................ | 385/24 |
| 7,433,557 B2 * | 10/2008 | Chen et al. | ................ | 385/31 |
| 7,529,459 B1 * | 5/2009 | Wang et al. | ................ | 385/140 |
| 7,546,008 B2 * | 6/2009 | Fujino et al. | ................ | 385/31 |
| 7,805,047 B2 * | 9/2010 | Rikimaru et al. | ................ | 385/140 |
| 2008/0285915 A1 | 11/2008 | Rikimaru et al. | | |

FOREIGN PATENT DOCUMENTS

| | | |
|---|---|---|
| EP | 1 887 392 | 2/2008 |
| JP | 2004-70052 | 3/2004 |
| JP | 2004-70054 | 3/2004 |
| JP | 2004-77708 | 3/2004 |
| JP | 2006-218540 | 8/2006 |
| JP | 2008-40435 | 2/2008 |

* cited by examiner

Primary Examiner — Loha Ben
(74) Attorney, Agent, or Firm — Staas & Halsey LLP

(57) ABSTRACT

An optical attenuator includes a first reflection portion reflecting a light incoming from an optical input portion in a direction different from incoming axis, a second reflection portion reflecting the light from the first reflection portion, an optical output portion outputting the light that is reflected by the first reflection portion after being reflected by the second reflection portion, and an optical-intensity-attenuation filter that is arranged on an optical path between the first reflection portion and the second reflection portion, optical transmittance being shifted in stages according to a position thereof. The first reflection portion is capable of turning to shift an incoming position at the optical-intensity-attenuation filter.

7 Claims, 8 Drawing Sheets

| ATTENUATION AMOUNT (dB) | 0 | 0.1 | 0.2 | .... | 20 |
|---|---|---|---|---|---|
| CONTROL VOLTAGE (V) | 0 | 0.5 | 1 | .... | 100 |

OPTICAL ATTENUATOR

CROSS-REFERENCE TO RELATED APPLICATION

This application is based upon and claims the benefit of priority of the prior Japanese Patent Application No. 2008-171765, filed on Jun. 30, 2008, the entire contents of which are incorporated herein by reference.

FIELD

The present invention generally relates to an optical attenuator.

BACKGROUND

Japanese Laid-open Patent Publication No. 2004-70054 and Japanese Laid-open Patent Publication No. 2008-40435 disclose optical attenuators having a micro electro mechanical systems (MEMS) mirror. Optical attenuation amount is controlled according to a rotation angle of the MEMS mirror in the optical attenuators.

SUMMARY

According to an aspect of the present invention, there is provided an optical attenuator including a first reflection portion, a second reflection portion, an optical output portion and an optical-intensity-attenuation filter. The first reflection portion reflects a light incoming from an optical input portion in a direction different from incoming axis. The second reflection portion reflects the light from the first reflection portion. The optical output portion outputs the light that is reflected by the first reflection portion after being reflected by the second reflection portion. The optical-intensity-attenuation filter is arranged on an optical path between the first reflection portion and the second reflection portion, optical transmittance being shifted in stages according to a position thereof. The first reflection portion is capable of turning to shift an incoming position at the optical-intensity-attenuation filter.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

A description will now be given of embodiments with reference to the accompanying drawings.

First Embodiment

Figure 1:
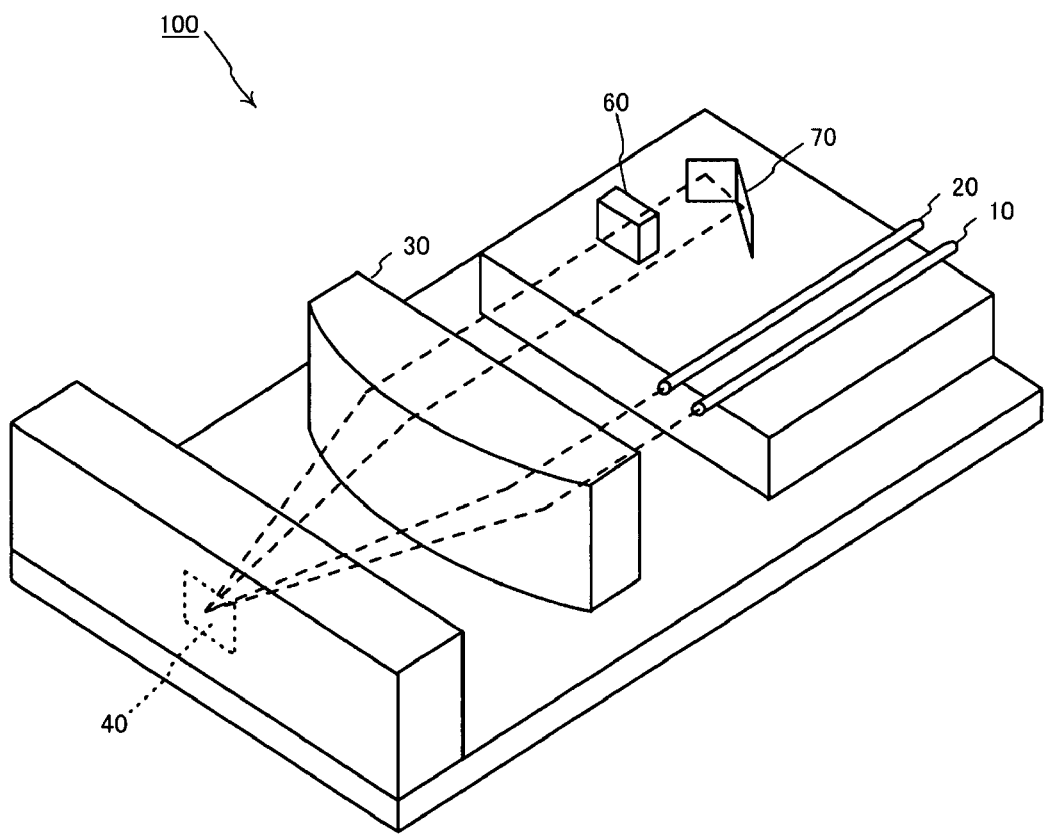
FIG. 1 illustrates a perspective view of an optical attenuator in accordance with a first embodiment.
Figure 2A:
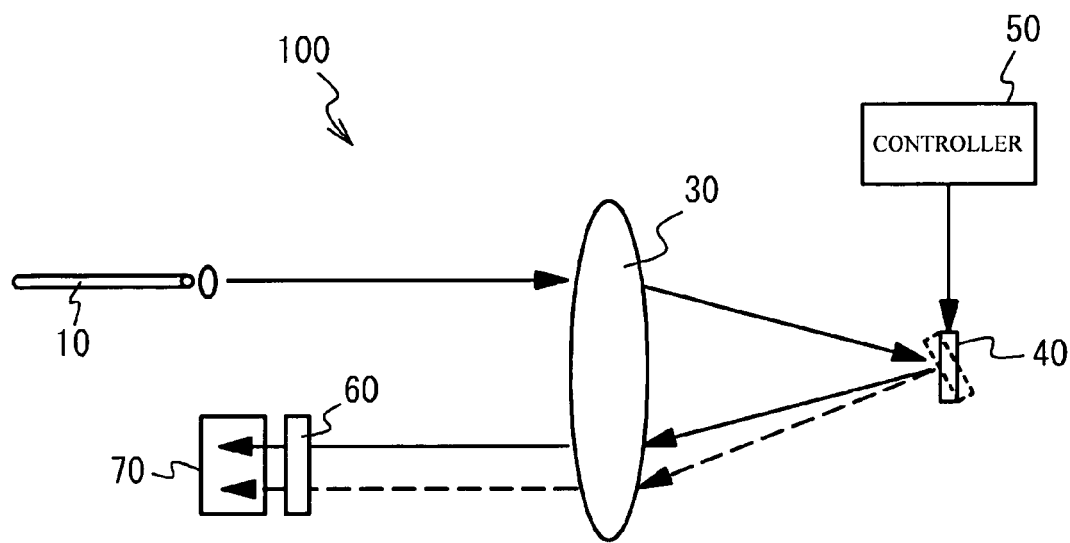
FIG. 2A and FIG. 2B illustrate a schematic view of the optical attenuator in accordance with the first embodiment.
Figure 2B:
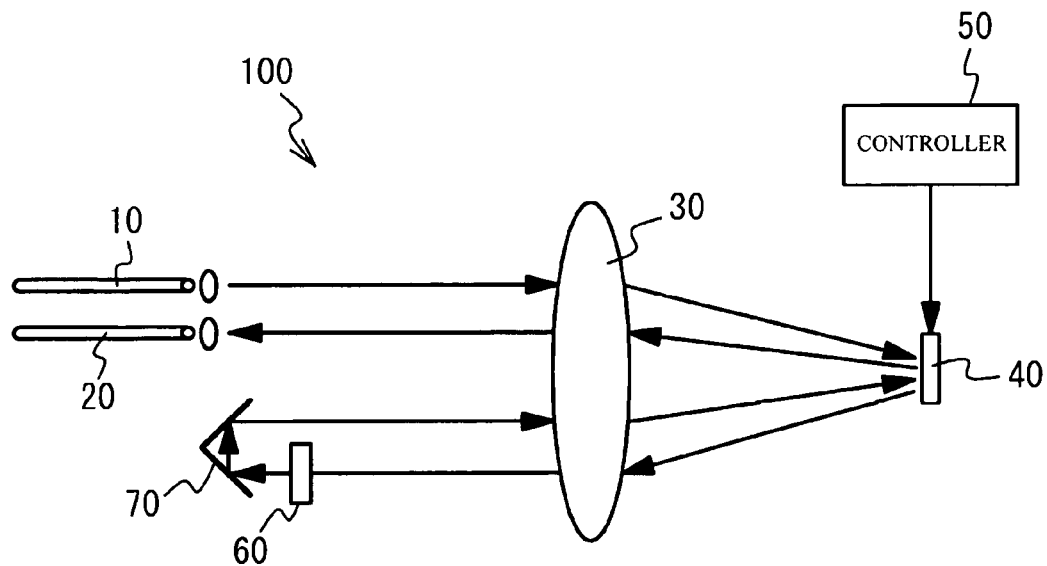

FIG. 1, FIG. 2A and FIG. 2B illustrate a schematic view of an optical attenuator 100 in accordance with a first embodiment. FIG. 1 illustrates a perspective view of the optical attenuator 100. FIG. 2A illustrates a side view of the optical attenuator 100. FIG. 2B illustrates a top view of the optical attenuator 100. As illustrated in FIG. 1, FIG. 2A and FIG. 2B, the optical attenuator 100 has an input port 10, an output port 20, a collecting lens 30, a MEMS mirror 40, a controller 50, a neutral density filter (ND filter) 60 and a mirror 70.

The input port 10 has an input fiber and a collimating lens. The output port 20 has an output fiber and a collimating lens. The collecting lens 30 is a lens for collecting light on an optical path from the input port 10 to the output port 20. In the embodiment, the collecting lens 30 is arranged so that a light between the input port 10 and the MEMS mirror 40, between the MEMS mirror 40 and the mirror 70, and between the MEMS mirror 40 and the output port 20 passes through the collecting lens 30.

The MEMS mirror 40 reflects a light incoming from the input port 10 in a direction different from the incoming axis. In the embodiment, the MEMS mirror 40 is arranged so as to reflect the light incoming from the input port 10 to the ND filter 60 through the collecting lens 30. The MEMS mirror 40 is capable of turning to shift an incoming position at the ND filter 60, according to a control voltage applied from the controller 50.

The controller 50 has a central processing unit (CPU), a read only memory (ROM), a random access memory (RAM), and so on. The controller 50 controls the rotation angle of the MEMS mirror 40 with the control voltage.

Figures 3A, 3B:
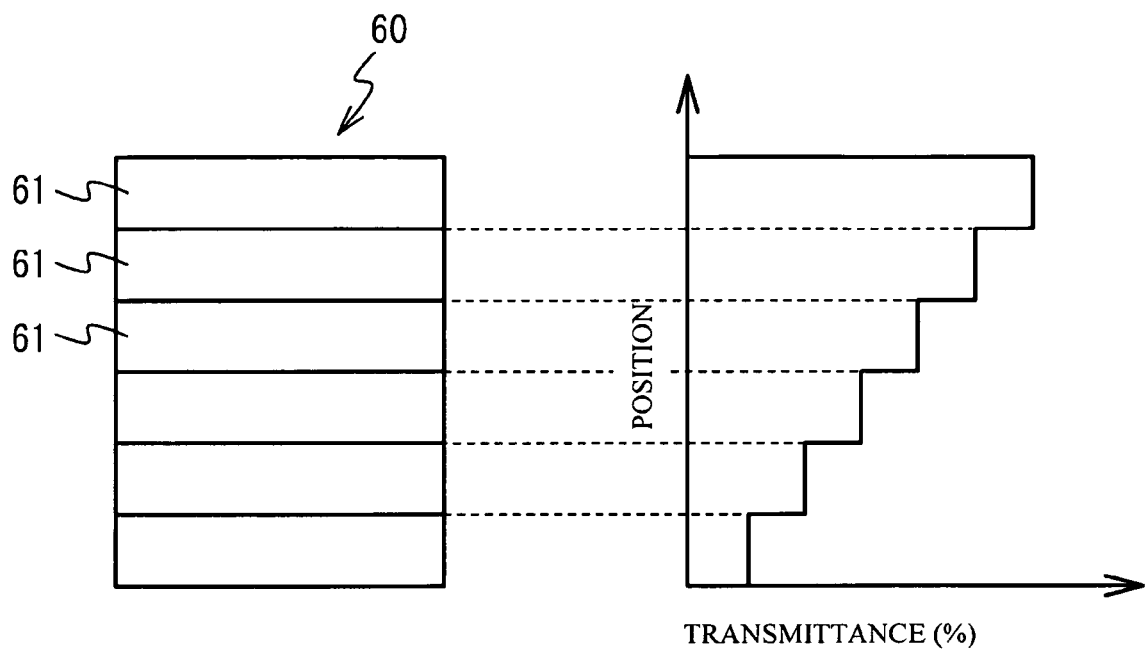
FIG. 3A and FIG. 3B illustrate details of a ND filter.

The ND filter 60 is a filter in which an optical transmittance is shifted according to a position thereof. FIG. 3A and FIG. 3B illustrate details of the ND filter 60. FIG. 3A illustrates a schematic view of a surface of the ND filter 60. FIG. 3B illustrates the optical transmittance according to a position of the ND filter 60.

As illustrated in FIG. 3A, the ND filter 60 has a plurality of strip-shaped regions 61 at even intervals or at uneven intervals that have optical transmittance different from each other. In the embodiment, the optical transmittance of the ND filter 60 is shifted in stages according to the position thereof as illustrated in FIG. 3B. Each width of the regions 61 is, for example, a few tens μm to a few hundreds μm. It is possible to form the ND filter 60 by changing deposition amount according to a position on a glass substrate. And it is possible to form the ND filter 60 by changing material of the deposition according to the position. And a filter, in which a plurality of filters having optical transmittance different from each other are arranged on an light entrance face, may be used instead of the ND filter 60.

The mirror 70 is a mirror for reflecting a light passing through the ND filter 60 to the MEMS mirror 40. In the embodiment, the mirror 70 reflects an incoming light passing through the ND filter 60 so that the reflected light bypasses the ND filter 60. The mirror 70 has a structure in which a first face and a second face are arranged to form a roof. The light passing through the ND filter 60 enters the first face. An angle between the first face and the second face is designed so that a light reflected by the first face to the second face is reflected by the second face and bypasses the ND filter 60.

Next, a description will be given of a working of the optical attenuator 100. A light fed into the input port 10 enters the MEMS mirror 40 through the collecting lens 30. The light reflected by the MEMS mirror 40 enters the ND filter 60 through the collecting lens 30. The light fed into the ND filter 60 enters the mirror 70 through the ND filter 60.

The light reflected by the mirror 70 enters the MEMS mirror 40 through the collecting lens 30. The light reflected by the MEMS mirror 40 enters the output port 20 through the collecting lens 30. Thus, the light is output from the output port 20.

An incoming position at the ND filter 60 is shifted by the collecting lens 30 according to a rotation of the MEMS mirror 40. In this case, the incoming position is shifted over each region 61 of the ND filter 60. An optical transmittance of the ND filter 60 is therefore shifted in stages according to the rotation of the MEMS mirror 40. In this case, optical attenuation amount is shifted in stages according to the optical transmittance changing. The optical attenuation amount is determined by the property of the ND filter 60.

Figure 4A:
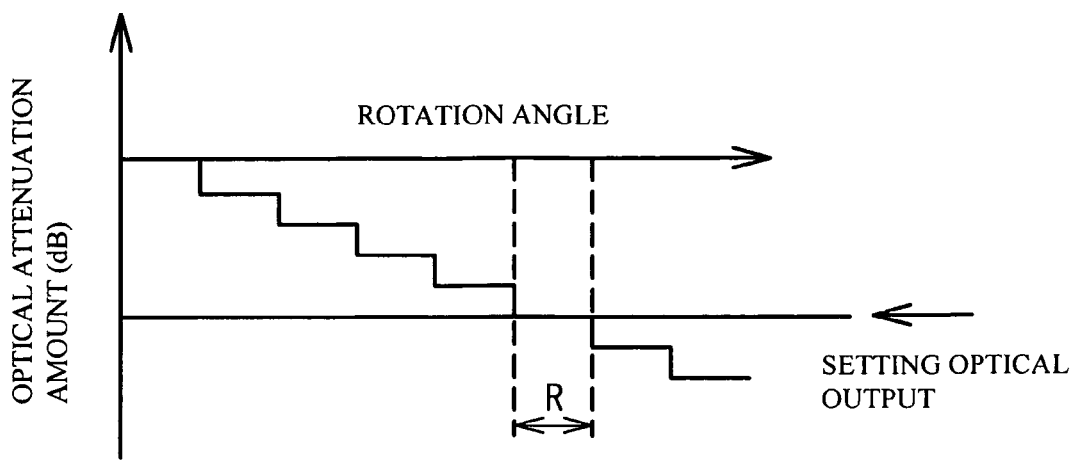
FIG. 4A and FIG. 4B illustrate a relation between a rotation angle and an optical attenuation amount of a MEMS mirror.

FIG. 4A illustrates a relationship between a rotation angle of the MEMS mirror 40 and the optical attenuation amount. In FIG. 4A, a horizontal axis indicates the rotation angle of the MEMS mirror 40. A vertical axis indicates the optical attenuation amount.

As illustrated in FIG. 4A, the optical attenuation amount is shifted in stages according to the rotation angle changing of the MEMS mirror 40. In this case, the rotation angle has a range where the optical attenuation amount is constant. It is therefore possible to limit the optical attenuation fluctuation even if the rotation angle fluctuates because of an external factor such as a noise, a vibration, or a shock. The rotation angle range with respect to each optical attenuation is hereinafter referred to as a fluctuation-limited range R.

Figure 4B:
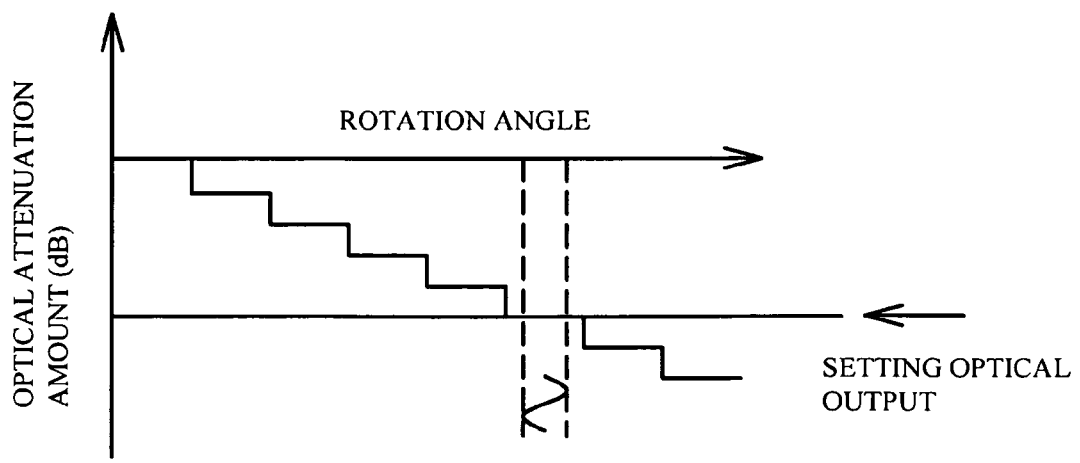

FIG. 4B illustrates a case where the rotation angle of the MEMS mirror 40 fluctuates because of the external factors. As illustrated in FIG. 4B, the fluctuation of the optical attenuation amount is limited if the rotation angle after fluctuation is within the fluctuation-limited range R. For example, it is possible to limit the fluctuation of the optical attenuation caused by the external factors by setting the rotation angle with respect to each attenuation around a center of the fluctuation-limited range R.

It is preferable that the optical attenuation amount is shifted in stages and discontinuously with respect to the rotation angle fluctuation. That is, it is preferable that the optical transmittance of the ND filter 60 is shifted in stages and discontinuously according to the position thereof. This is because the fluctuation of the optical attenuation amount may be limited even if the rotation angle fluctuates because of the external factors.

An interval of each attenuation stage determined by the ND filter 60 may be determined according to system requirement when the optical attenuator 100 is used. For example, the interval may be 0.1 dB to 0.3 dB. The fluctuation-limited range R may be determined according to a noise range of a control circuit of the MEMS mirror 40, a vibration-shock standard applied to telecommunication systems and so on. The noise range of the control circuit is, for example, 10 mVpp to 20 mVpp as a noise range of the controller 50. For example, GR-63-CORE may be used as the vibration-shock standard. In this case, the vibration-shock standard is 0.1 G in a range of 5 Hz to 100 Hz at 0.1 octave/min, and 1.5 G in a range of 100 Hz to 500 Hz at 0.25 octave/min.

A rotation angle fluctuating because of the control circuit noise, the vibration, the shock or the like is shown as "$\Delta\theta$". In this case, fluctuation amount of the optical axis angle is $2\cdot\Delta\theta$.

Fluctuation range of light-incoming position on the light-incoming face of the ND filter 60 is $2\cdot\Delta\theta\cdot f$, when the focal length of the collecting lens 30 is shown as "f" and the MEMS mirror 40 is located at a focal position of the collecting lens 30. It is therefore preferable that a range $\Delta x$ of a region of the ND filter 60 where the optical transmittance is constant is $2\cdot\Delta\theta\cdot f$ or more. The fluctuation-limited range R is determined with the range $\Delta x$ as a parameter.

An angle of an electrostatic drive type MEMS mirror is generally proportional to a square of a voltage applied to the MEMS mirror. A relationship between a control voltage and an optical attenuation amount may be linear when the fluctuation-limited range R fluctuates with a function of a square root of position.

Figures 5A, 5B:
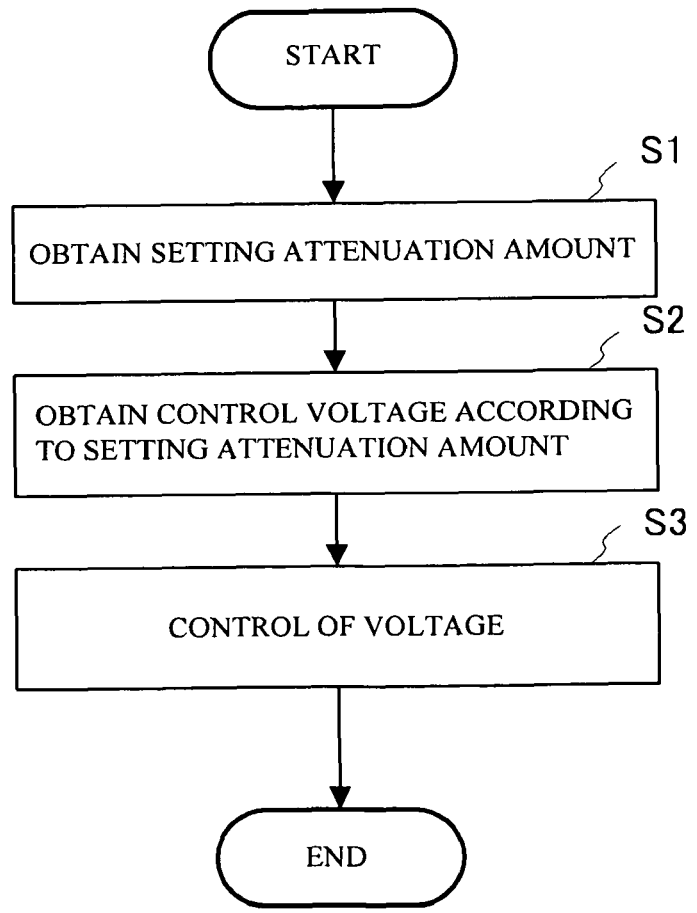
FIG. 5A and FIG. 5B illustrate a control of a voltage applied to the MEMS mirror.

FIG. 5A illustrates an example of a control voltage stored in the controller 50. As illustrated in FIG. 5A, the controller 50 stores a control voltage of the MEMS mirror 40 according to a setting attenuation amount. The controller 50 controls a voltage applied to the MEMS mirror 40 based on the table illustrated in FIG. 5A, when the attenuation amount is set.

FIG. 5B illustrates an example of a flowchart for controlling the voltage applied to the MEMS mirror 40. As illustrated in FIG. 5B, the controller 50 obtains the setting attenuation amount (Step S1). Next, the controller 50 obtains the control voltage according to the setting attenuation amount from the table illustrated in FIG. 5A (Step S2). Next, the controller 50 controls the control voltage applied to the MEMS mirror 40 (Step S3). After that, the controller 50 terminates the execution of the control in accordance with the flowchart.

The controller 50 may store the control voltage so that setting value of the rotation angle according to each attenuation amount is around the center of the fluctuation-limited range R.

In accordance with the embodiment, it is not necessary to adopt expensive low-noise-stabilized power supply, to add a noise filter, and to add a damper for adsorption of vibration and shock. It is therefore possible to reduce cost. And it is possible to increase connection steps because amplification of the optical output fluctuation is limited because of stabilization of optical output even if devices are connected to each other in multistage in an optical network. It is therefore possible to reduce the cost of the system.

In the embodiment, the input port 10 acts as the optical input portion, the output port 20 acts as the optical output portion, the MEMS mirror 40 acts as the first reflection portion, the mirror 70 acts as the second reflection portion, and the ND filter 60 acts as the optical intensity attenuation filter.

Second Embodiment

Figure 6A:
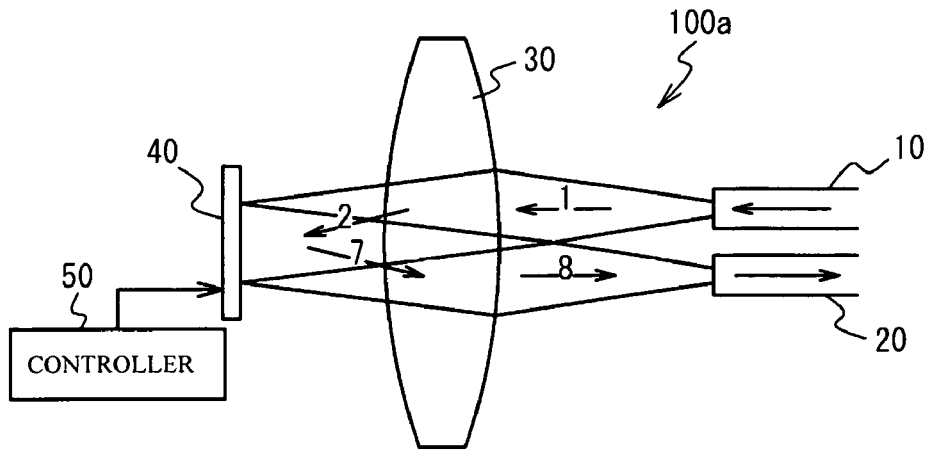
FIG. 6A through FIG. 6C illustrate a schematic view of an optical attenuator in accordance with a second embodiment.
Figure 6B:
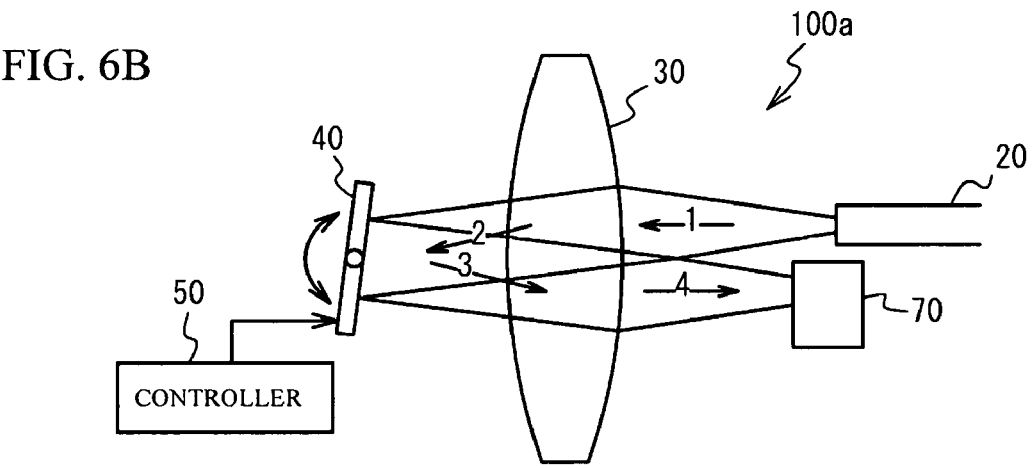
Figure 6C:
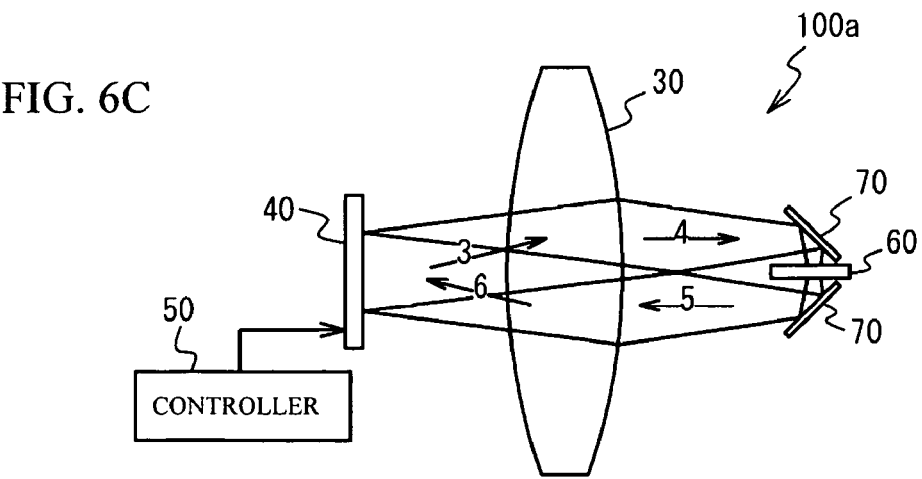

FIG. 6A through FIG. 6C illustrate a schematic view of an optical attenuator 100a in accordance with a second embodiment. FIG. 6A illustrates a top view of the optical attenuator 100a. FIG. 6B illustrates a side view of the optical attenuator 100a. FIG. 6C illustrates a bottom view of the optical attenuator 100a.

The optical attenuator 100a does not have the collimating lens in the input port 10 or in the output port 20. The ND filter 60 is arranged on the optical axis between the first face and the second face of the mirror 70. The optical attenuator 100a has the same structure as the optical attenuator 100 in FIG. 1, FIG. 2A and FIG. 2B in other respects. Light propagation has a numeral in FIG. 6A thorough FIG. 6C.

As illustrated in FIG. 6A through FIG. 6C, a light fed into the input port 10 enters the MEMS mirror 40 through the collecting lens 30. A light reflected by the MEMS mirror 40 enters the first face of the mirror 70 through the collecting lens

30. The light reflected by the first face of the mirror 70 enters the ND filter 60. The light fed into the ND filter 60 enters the second face of the mirror 70 through the ND filter 60.

The light reflected by the second face of the mirror 70 enters the MEMS mirror 40 through the collecting lens 30. The light reflected by the MEMS mirror 40 enters the output port 20 through the collecting lens 30. Thus, the light is output from the output port 20.

In the embodiment, a single piece of the collecting lens 30 acts as a collimator and adjusts a position and an angle of the light. It is therefore possible to reduce number of components. This results in reduction of the cost. A light diameter (a beam diameter) is reduced around a center between the first face and the second face of the mirror 70. It is therefore possible to reduce a width of a region where the optical transmittance of the ND filter 60 is constant. This results in downsizing of the ND filter 60.

Third Embodiment

Figure 7A:
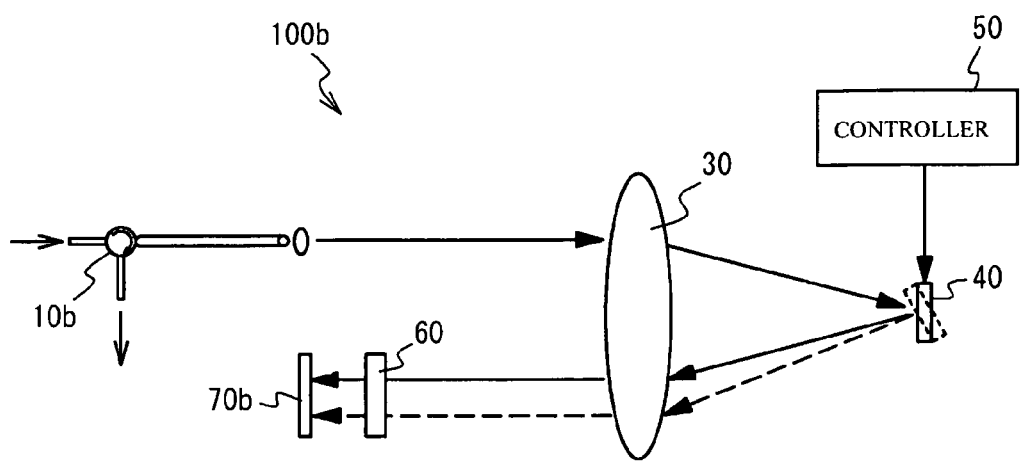
FIG. 7A and FIG. 7B illustrate a schematic view of an optical attenuator in accordance with a third embodiment.
Figure 7B:
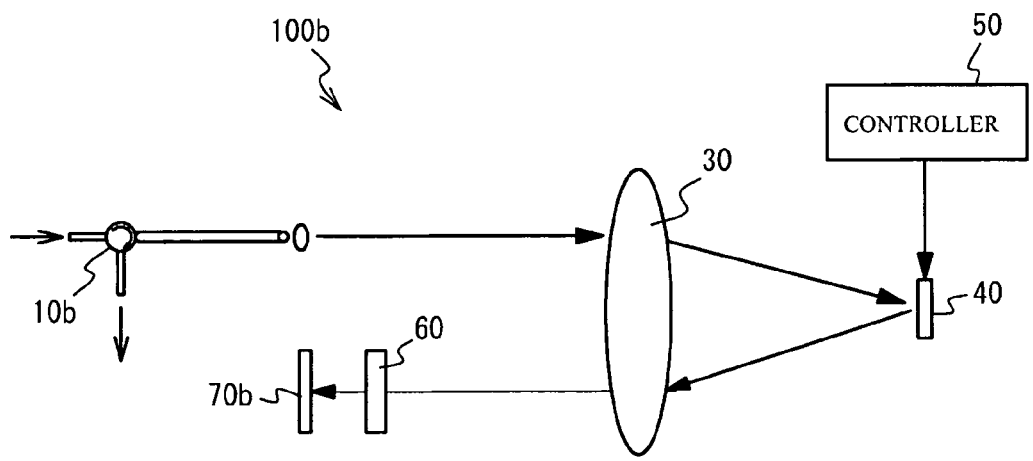

FIG. 7A and FIG. 7B illustrate a schematic view of an optical attenuator 100*b* in accordance with a third embodiment. FIG. 7A illustrates a side view of the optical attenuator 100*a*. FIG. 7B illustrates a top view of the optical attenuator 100*a*. As illustrated in FIG. 7A and FIG. 7B, the optical attenuator 100*b* has an optical circulator 10*b* instead of the input port 10 and the output port 20.

The optical circulator 100*b* acts as an input port and an output port. Therefore, a plate-shaped mirror 70*b* can be used instead of the mirror 70.

In the embodiment, the optical circulator 10*b* acts as the input port and the output port. The mirror 70*b* acts as the second reflection portion.

Fourth Embodiment

Figure 8A:
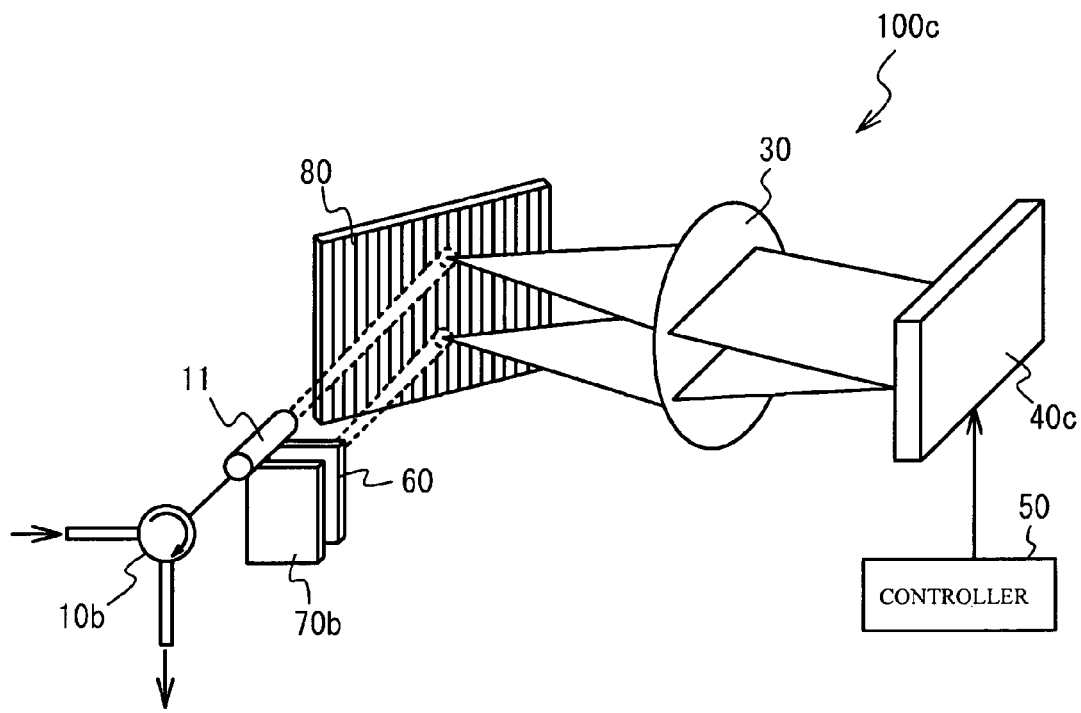
FIG. 8A and FIG. 8B illustrate a schematic view of an optical attenuator in accordance with a fourth embodiment.

FIG. 8A illustrates a schematic view of an optical attenuator 100*c* in accordance with a fourth embodiment. The optical attenuator 100*c* is an optical attenuator that can be adapted to a multiple-wavelength light. As illustrated in FIG. 8A, the optical attenuator 100*c* has a diffraction grating 80. The optical circulator 10*b* has a collimator 11. A MEMS mirror array 40*c* is provided instead of the MEMS mirror 40. The optical attenuator 100*c* has the same structure as the optical attenuator 100*b* in FIG. 7A and FIG. 7B in other respects.

The diffraction grating 80 is arranged so that a light from the collimator 11 is divided and enters the collecting lens 30. The ND filter 60 is arranged so as to transmit a light that is reflected by the MEMS mirror array 40*c* and is combined by the diffraction grating 80. The diffraction grating 80 may adopt a transmission diffraction grating.

Figure 8B:
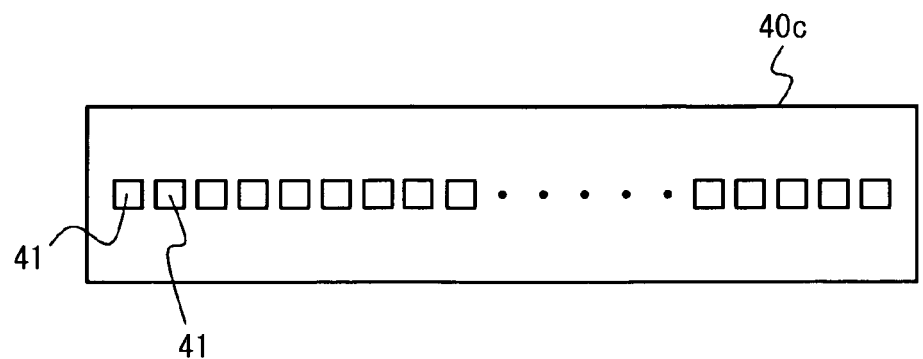

FIG. 8B illustrates a schematic view of a light entrance face of the MEMS mirror array 40*c*. As illustrated in FIG. 8B, the MEMS mirror array 40*c* has a structure in which a plurality of MEMS mirrors 41 are arranged in array. Each of the MEMS mirrors. 41 is arranged according to an entrance position of each wavelength light of a light divided by the diffraction grating 80. Rotation angle of each MEMS mirror 41 is controlled independently. It is therefore possible to control the attenuation amount with respect to each wavelength light.

In the embodiment, the MEMS mirror array 40*c* acts as the first reflection portion.

In accordance with the above-mentioned embodiments, the attenuation amount of the optical attenuator is shifted in stages according to the rotation of the first reflection portion. In this case, the rotation angle has a given range with respect to each optical attenuation amount. That is, the rotation angle has a range where the optical attenuation amount is constant. It is therefore possible to limit the fluctuation of the optical attenuation amount, even if the rotation angle is shifted.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. An optical attenuator comprising:
a first reflection portion reflecting a light incoming from an optical input portion in a direction different from incoming axis;
a second reflection portion reflecting the light from the first reflection portion;
an optical output portion outputting the light that is reflected by the first reflection portion after being reflected by the second reflection portion; and
an optical-intensity-attenuation filter that is arranged on an optical path between the first reflection portion and the second reflection portion, optical transmittance being shifted in stages according to a position thereof, the optical transmittance being constant in a range of each of the stages,
wherein the first reflection portion is capable of turning to shift an incoming position at the optical-intensity-attenuation filter.

2. The optical attenuator as claimed in claim 1, wherein the first reflection portion is a mirror of which rotation angle is shifted according to a voltage applied to the first reflection portion.

3. The optical attenuator as claimed in claim 1, wherein the optical-intensity-attenuation filter is a ND filter in which optical transmittance is shifted in stages according to the position thereof.

4. The optical attenuator as claimed in claim 1, wherein the second reflection portion shifts reflection position according to the incoming position.

5. The optical attenuator as claimed in claim 1, wherein:
the second reflection portion is a board-shaped mirror; and
the optical input portion and the optical output portion are an optical circulator.

6. An optical attenuator comprising:
a first reflection portion reflecting a light incoming from an optical input portion in a direction different from incoming axis;
a second reflection portion reflecting the light from the first reflection portion;
an optical output portion outputting the light that is reflected by the first reflection portion after being reflected by the second reflection portion; and
an optical-intensity-attenuation filter that is arranged on an optical path between the first reflection portion and the second reflection portion, optical transmittance being shifted in stages according to a position thereof,
wherein:
the first reflection portion is capable of turning to shift an incoming position at the optical-intensity-attenuation filter; and the optical transmittance of the optical-intensity-attenuation filter is shifted in stages and discontinuously according to the position thereof.

7. An optical attenuator comprising:

a first reflection portion reflecting a light incoming from an optical input portion in a direction different from incoming axis;

a second reflection portion reflecting the light from the first reflection portion;

an optical output portion outputting the light that is reflected by the first reflection portion after being reflected by the second reflection portion;

an optical-intensity-attenuation filter that is arranged on an optical path between the first reflection portion and the second reflection portion, optical transmittance being shifted in stages according to a position thereof, and a diffraction grating provided on an optical path between the optical input portion and the first reflection portion, wherein:

the first reflection portion is capable of turning to shift an incoming position at the optical-intensity-attenuation filter;

a plurality of the first reflection portions are arranged in array; and each of the first reflection portions is arranged at incoming position of each wavelength light divided by the diffractive grating.

* * * * *